United States Patent
Liang et al.

(10) Patent No.: US 9,690,761 B1
(45) Date of Patent: *Jun. 27, 2017

(54) SYSTEMS AND METHODS FOR PROVIDING MOBILE BROWSER ACCESS TO MOBILE DEVICE FUNCTIONALITIES

(71) Applicant: United Services Automobile Association (USAA), San Antonio, TX (US)

(72) Inventors: Minya Liang, McKinney, TX (US); Teddy J. E. Voutour, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,804

(22) Filed: Jun. 2, 2015

Related U.S. Application Data

(63) Continuation of application No. 13/909,680, filed on Jun. 4, 2013, now Pat. No. 9,052,922, which is a (Continued)

(51) Int. Cl.
*G06F 9/44* (2006.01)
*G06F 17/22* (2006.01)
(Continued)

(52) U.S. Cl.
CPC .... *G06F 17/2235* (2013.01); *G06F 17/30887* (2013.01); *H04L 67/02* (2013.01); *H04L 67/1085* (2013.01)

(58) Field of Classification Search
None
See application file for complete search history.

(56) References Cited

U.S. PATENT DOCUMENTS

| 7,650,390 | B2 | 1/2010 | Arner et al. |
| 8,458,656 | B1 * | 6/2013 | Liang .................. G06F 9/44521 717/118 |

(Continued)

FOREIGN PATENT DOCUMENTS

WO WO2008037344 A3 6/2008

OTHER PUBLICATIONS

Liu, B., et al. "A small listener for heterogeneous mobile devices: a service enabler with a uniform Web object view", Web Services, 2005. ICWS 2005. 2005 IEEE International Conference, Jul. 11-15, 2005. 1 pg.

*Primary Examiner* — Chuck Kendall
(74) *Attorney, Agent, or Firm* — Fish & Richardson P.C.

(57) ABSTRACT

A content handler application that may be provided on a mobile device to provide extensions to a web based application. The content handler may provide the web application access features such as the camera, GPS, A/V input and output, file system and secure uploads. The content handler may be a certified application for use on the mobile device and calls applications to access the features of the mobile device. The web applications may be updated without concern for the content handler. Because the user experience and business logic are contained in the web application they are unaffected by the certification and multi-platform issues as this is limited to only the content handler.

24 Claims, 4 Drawing Sheets

Related U.S. Application Data continuation of application No. 12/197,654, filed on Aug. 25, 2008, now Pat. No. 8,458,656.

(51) Int. Cl.
*H04L 29/08* (2006.01)
*G06F 17/30* (2006.01)

(56) References Cited

U.S. PATENT DOCUMENTS

| | | |
|---|---|---|
| 9,052,922 B1 * | 6/2015 | Liang .................. G06F 9/44521 |
| 2002/0174117 A1 | 11/2002 | Nykanen |
| 2004/0158813 A1 | 8/2004 | Xia et al. |
| 2006/0031387 A1 | 2/2006 | Hamzeh et al. |
| 2006/0033809 A1 | 2/2006 | Farley |
| 2007/0099658 A1 | 5/2007 | Borquez et al. |
| 2008/0228777 A1 | 9/2008 | Sawant |
| 2009/0300578 A1 | 12/2009 | Neil |
| 2010/0005481 A1 | 1/2010 | Lewis et al. |

* cited by examiner

SYSTEMS AND METHODS FOR PROVIDING MOBILE BROWSER ACCESS TO MOBILE DEVICE FUNCTIONALITIES

CROSS-REFERENCE TO RELATED APPLICATIONS

This application is a continuation of and claims priority under 35 U.S.C. §120 to U.S. application Ser. No. 13/909,680, filed on Jun. 4, 2013 (U.S. Pat. No. 9,052,922 to be issued on Jun. 9, 2015), which is a continuation of U.S. application Ser. No. 12/197,654, filed Aug. 25, 2008, now U.S. Pat. No. 8,458,656, the entire contents of which are hereby incorporated by reference. The presently disclosed subject matter is related to the following applications: Ser. No. 12/197,671 filed Aug. 25, 2008, and U.S. application Ser. No. 12/197,685, filed Aug. 25, 2008.

BACKGROUND

Some mobile applications ask the user to upload data or use features such as the camera as part of the interaction with the application. However, mobile web browsers have limited capabilities and do not provide functionalities of many personal computer-based web browsers. When applications are implemented in a mobile web application, either the implementation is limited as compared to a personal-computer based web application, or the user is asked to exit or minimize the web application to access device functionalities such as the camera or file system and return when completed.

One solution is to create a downloadable application, such as a Java 2, Micro Edition (J2ME) application to provide access to the mobile device functionalities. The J2ME platform is a set of standard Java application program interfaces (APIs), and provides, e.g., a user interface, a robust security model, built-in network protocols, and support for networked and disconnected applications. J2ME applications may be downloaded dynamically and, through provided APIs, utilize the native capabilities of the mobile device. The standard set of J2ME APIs may be extended using optional packages for each specific mobile device, such that manufacturers may leverage the features of each mobile device.

However, the wireless carriers require that software loaded on mobile device be certified through an extensive process. In addition, there are multi-platform support issues with downloadable web applications because of the many different types of mobile devices. These problems are made even more complex because certification and support issues are repeated each time a new version of the software is released.

SUMMARY

A content handler application that may be provided on a mobile device to provide extensions to a web based application. The content handler may provide the web application access features such as the camera, file system and secure uploads. The content handler may call other applications to access the features of the mobile device. The applications may be updated without concern for the content handler.

According to some implementations, there is provided a method for accessing mobile device functionalities using web-based applications. The method may include receiving a selection of a link displayed in the web-based application, determining a functionality to be invoked in accordance with the selection, and determining an application associated with the functionality using a content handler API. Next, the application is executed to perform the functionality on the mobile device, and control is returned to the web-based application.

In some implementations, there is provided a system for accessing mobile device functionalities using web-based applications. The system may include at least one subsystem for receiving a selection of a link displayed in the web-based application, at least one subsystem for determining a functionality to be invoked in accordance with the selection, and at least one subsystem for determining an application associated with the functionality using a content handler API. Also included may be at least one subsystem for executing the application to perform the functionality on the mobile device, and at least one subsystem for returning to the web-based application.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Methods and systems are provided to invoke, update and change mobile device-based applications that are launched from a certified application to enable quick deployment of mobile applications on a mobile device. The mobile device-based applications may be device independent applications that are loaded and processed within a web-based application environment to enable functionalities of native applications. By way of example, the mobile device-based applications may be configured to handle or call application programming interfaces (APIs) exposed by the device's native operating system in the same manner as native applications.

Figure 1:
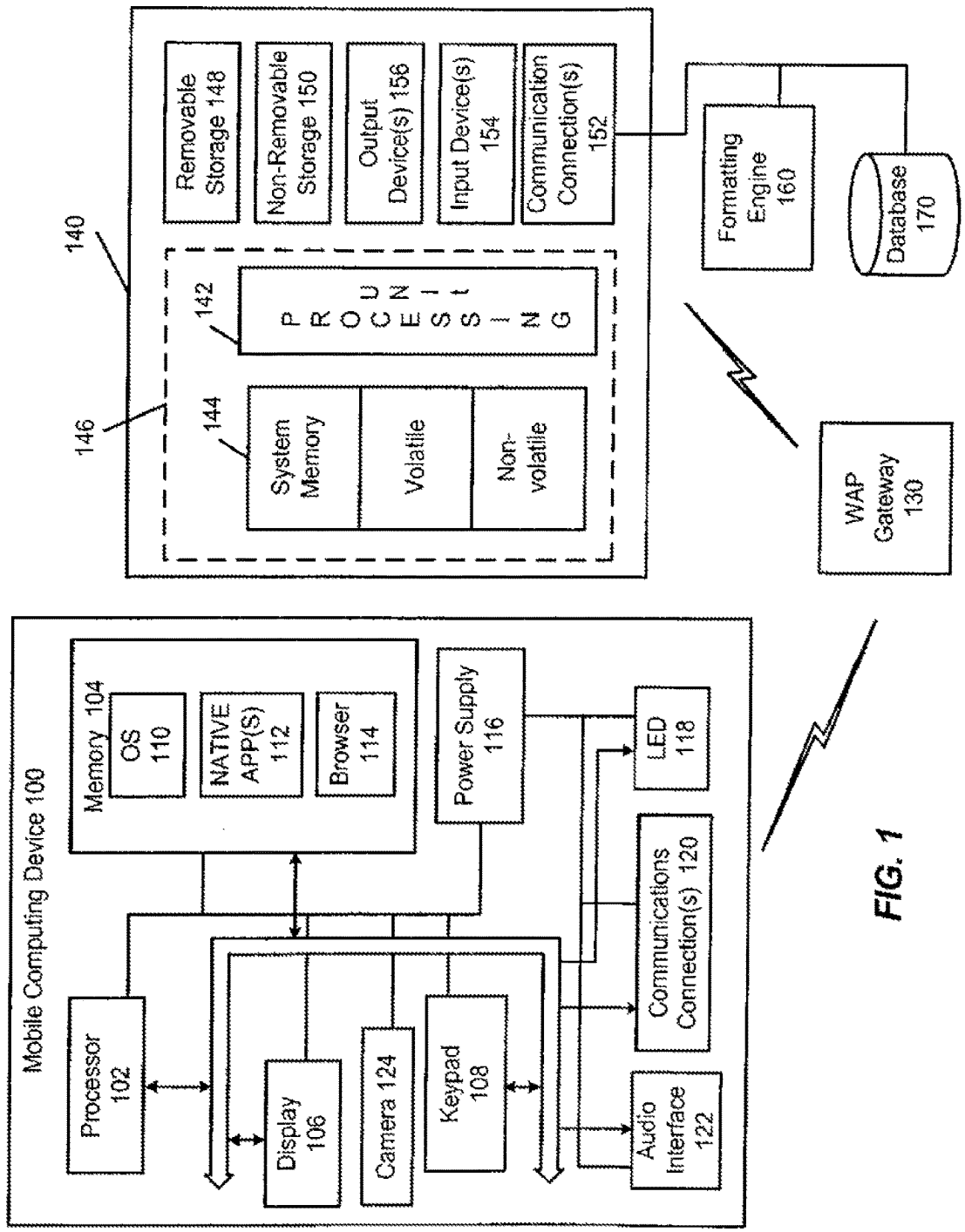
FIG. 1 shows an exemplary environment.

FIG. 1 illustrates an exemplary environment in which aspects of the disclosure may be implemented. A mobile device 100 includes a processor 102, a memory 104, a display 106, and a keypad 108. The memory 104 generally includes both volatile memory (e.g., RAM) and non-volatile memory (e.g., ROM, Flash Memory, or the like). The mobile device 100 includes an operating system 110, such as the WINDOWS MOBILE 6 operating system, or another operating system, which is resident in the memory 104 and executes on the processor 102.

The mobile device 100 may be configured in many different ways. For example, the mobile device 100 may be a mobile phone, a PDA, a mobile computer, and the like. The keypad 108 may be a push button numeric dialing pad (such as on a typical telephone), a multi-key keyboard (such as a conventional keyboard). The display 106 may be a liquid crystal display, or any other type of display commonly used in mobile devices. The display 106 may be touch-sensitive, and may act as an input device.

One or more native application programs 112 may be loaded into the memory 104 and run on the operating system 110. A browser application 114 may be a native application or non-native (e.g., a Java application) and is configured to retrieve and display documents from web servers accessible over a network, such as the Internet, LAN, WAN or a local web server running on the mobile device 100. The applications 112 and browser application 114 may reside in the hardware or software of the mobile device 100. The mobile device 100 may also include a non-volatile storage within memory 104. The non-volatile storage may be used to store persistent information which should not be lost if mobile device 100 is powered down.

The mobile device 100 includes a power supply 116, which may be implemented as one or more batteries. The power supply 116 might further include an external power source, such as an AC adapter or a powered docking cradle that supplements or recharges the batteries.

Mobile device 100 is shown with two types of optional external notification mechanisms: an LED 118 and an audio interface 122. These devices may be directly coupled to the power supply 116 so that when activated, they remain on for a duration dictated by a notification mechanism even though the processor 102 and other components might shut down to conserve battery power. The audio interface 122 is used to provide audible signals to and receive audible signals from the user. For example, the audio interface 122 may be coupled to a speaker for providing audible output and to a microphone for receiving audible input, such as to facilitate a telephone conversation.

Mobile device 100 also includes communications connection(s) 120, such as a wireless interface layer, that performs the function of transmitting and receiving communications, or a wired interface, such as a USB connection between the mobile device 100 and another computing device. The communications connection(s) 120 facilitates wireless connectivity between the mobile device 100 and the outside world. The communication connection 120 may be configured to connect to any type of wireless network. According to one implementation, transmissions to and from the communications connection(s) 120 are conducted under control of the operating system 110.

The mobile device 100 may include a camera 124 as an input device. The camera 124 may be activated through an action on the keypad 108 or touch-sensitive display 106. The camera 124 may include a multi-megapixel charge-coupled display (CCD) imaging device. Pictures or video taken by the camera may be stored in the memory 104.

A WAP Gateway 130 may serve as proxy or a service enabler located in the service layer, between the Internet and mobile networks. The service layer may include other service enablers for internet mobile applications, such as charging systems and mobile positioning systems. The WAP protocol runs like a tunnel from the mobile via radio communications towards the connectivity layer, the control layer and finally the service layer. WAP protocols are mobile network independent and work on top of different mobile networks such as GPRS, EDGE and WCDMA. WAP protocols are binary-based protocols and web servers do not support WAP protocols, thus the WAP gateway operates as a protocol converter between WAP protocols and common HTTP/TCP used by web servers on the Internet.

A web server 140 may be a computing device on the Internet running a process to serve web pages or other content. A particular web server may be identified by a Uniform Resource Locator (URL) or Internet Protocol (IP) address. The web server 140 may communicate a web page or other documents to the browser application 114. This information is usually in HTML or XHTML format, and may provide navigation to other web pages via hypertext links. Web pages may be requested and served from web servers using Hypertext Transfer Protocol (HTTP) or WAP.

Web pages may be defined from files of static text stored within the web server's file system (i.e., static web pages), or the web server may construct the XHTML or HTML for each web page when it is requested by a browser (i.e., dynamic web pages). Client-side scripting can make web pages more responsive to user input once in the client browser.

A formatting engine 160 may dynamically or statically create or retrieve the web pages in response to requests for documents received by the web server 140. A database 170 may store information about client devices, such as mobile device 100, store web pages to be served by the web server 140, or both. While the formatting engine 160 and database 170 are shown as being separate devices, they each may be included as part of the web server 140, or run on the same device.

For purposes of illustration, the web server 140 may be understood to be an exemplary general-purpose computing device having at least one processing unit 142 and memory 144. Depending on the exact configuration and type of computing device, memory 144 may be volatile (such as random access memory (RAM)), non-volatile (such as read-only memory (ROM), flash memory, etc.), or some combination of the two. A basic configuration is illustrated in FIG. 1 by dashed line 146.

The web server 140 may have additional features/functionality. For example, the web server 140 may include additional storage (removable and/or non-removable) including, but not limited to, magnetic or optical disks or tape. Such additional storage is illustrated in FIG. 1 by removable storage 148 and non-removable storage 150.

The web server 140 typically includes a variety of computer readable media. Computer readable media can be any available media that can be accessed by the web server 140 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 144, removable storage 148, and non-removable storage 150 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the web server 140. Any such computer storage media may be part of the web server 140.

The web server 140 may contain communications connection(s) 152 that allow the device to communicate with other devices. The web server 140 may also have input device(s) 154 such as a keyboard, mouse, pen, voice input device, touch input device, etc. Output device(s) 156 such as a display, speakers, printer, etc. may also be included. All these devices are well known in the art and need not be discussed at length here.

Figure 2:
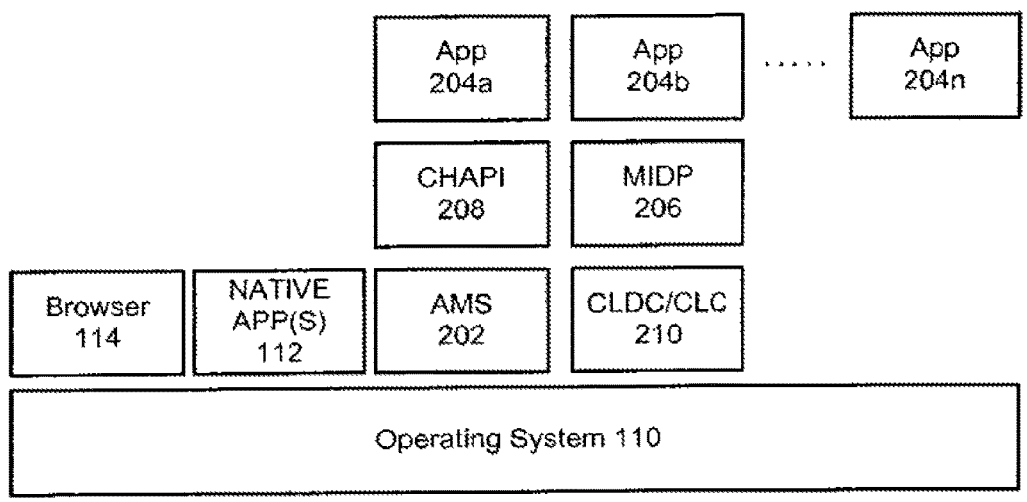
FIG. 2 illustrates an operating system and applications of a mobile device.

FIG. 2 illustrates the operating system and applications of the mobile device 100 in further detail. The mobile device 100 may include an Application Management Software (AMS) component 202 running on top of the operating system 110 that is a software component that manages the downloading and life cycle of MIDlet applications 204a . . . 204n. A MIDlet is a Java program designed for a J2ME virtual machine and operates as a content handler in the J2ME virtual machine. The mobile device 100 may include a Mobile Information Device Profile (MIDP) 202 that is a set of Java APIs which provides a complete J2ME application runtime environment in which the MIDlet applications 204a . . . 204n may run. The MIDP 202 provides a substantially complete Java runtime environment that leverages the capabilities of the mobile device 100. In this manner, the MIDP 202 is able to offer functionalities used by mobile applications (e.g., the user interface, network connectivity, local data storage, and application management, etc.). A CLDC/CLC component 210 provides for configuration of the Java runtime environment.

The mobile device 100 is capable of browsing or locating MIDlet suites available in a network, and utilizes the AMS 202 to facilitate MIDlet installation. The AMS 202 may also be used for upgrading the MIDlet applications 204a . . . 204n by checking for later versions, launching the MIDlet applications 204a . . . 204n, and removing MIDlet applications 204a . . . 204n from the mobile device 100.

In the environment of the mobile device 100, the MIDlet applications 204a . . . 204n are typically JAR files that are located and downloaded by the AMS 202. When a JAR file is downloaded to the mobile device 100, the AMS 202 first checks if the JAR file is signed or verified by, e.g., the wireless carrier or software vendor. If so, the JAR file is installed. Otherwise, the user may be asked if the JAR file is to be trusted and installed, or the JAR file may be rejected. As the JAR files are installed, a list of installed MIDlet applications 204a . . . 204n is maintained by the AMS 202. A particular MIDlet application (e.g., 204a) may be launched by the AMS 202 by user action (e.g., selecting one from a list) or by a call made to the AMS 202 by another application requesting the capabilities of a particular MIDlet application. If a MIDlet application is not available on the mobile device 100, the AMS 202 may download the MIDlet application over the air from an appropriate location.

For example, a J2ME Content Handler API (CHAPI) 208 provides for integration of J2ME applications into the mobile device's application environment. The CHAPI 208 manages the action to handle Uniform Resource Identifiers (URI) based on a MIME-type or other scheme. For example, MIDlet application 204a may be registered to handle the MIME type image/png. Other applications may then request the CHAPI 208 to display the image by calling application 204a. The CHAPI 208 includes mechanisms for invoking a content handler, such as application 204a, receiving responses, registering and unregistering content handlers and looking up installed handlers. The CHAPI 208 may also provide the capabilities for browsers and native applications as well as J2ME applications to invoke other J2ME applications.

In some implementations, the CHAPI 208 is certified for operation on the mobile device 100. The CHAPI 208 may then call MIDlet applications 204a . . . 204n regardless of their certification to enable and provide functionalities to the web-based applications running on the mobile device 100.

Figure 3:
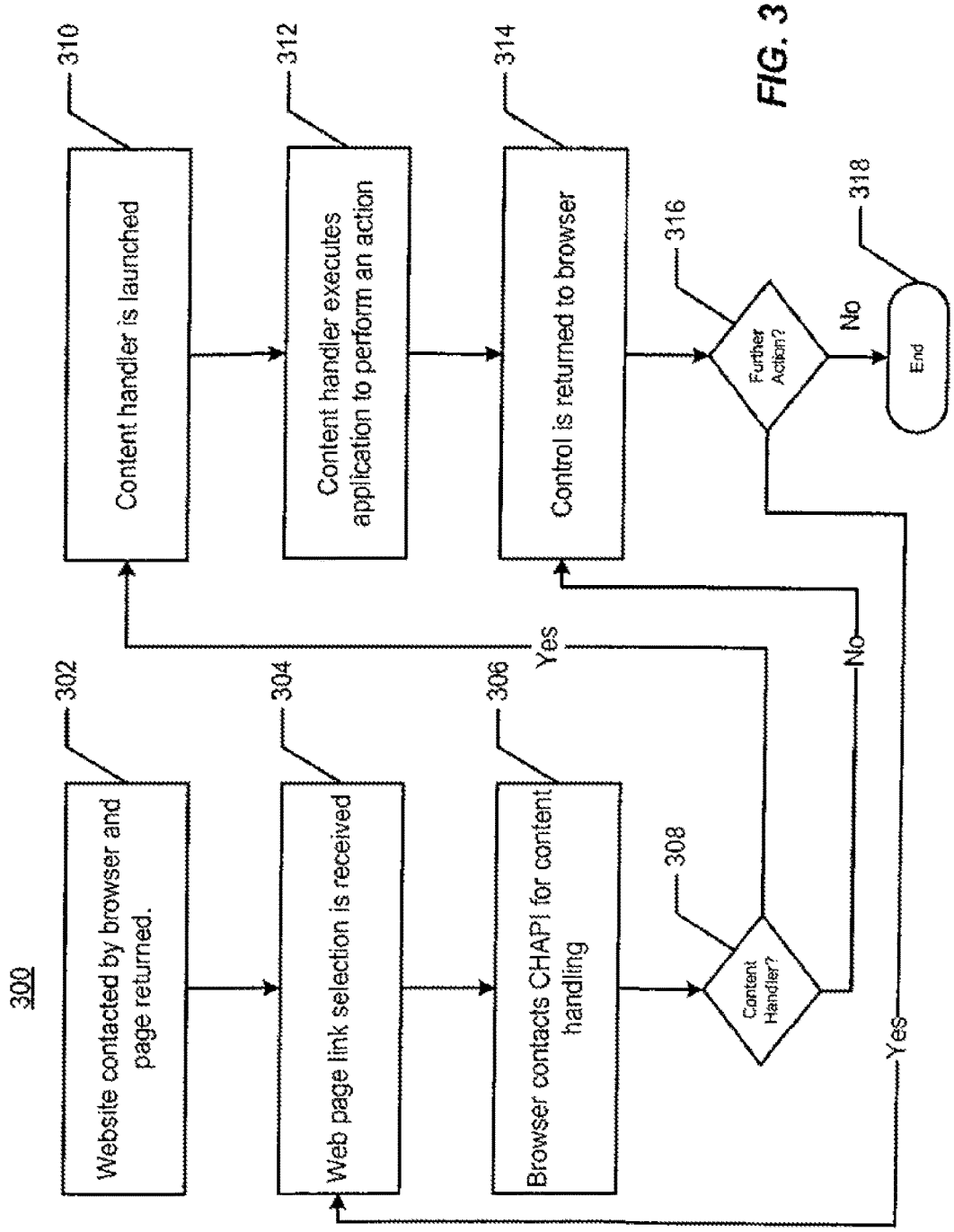
FIG. 3 illustrates an exemplary operational process for invoking an application.

FIG. 3 illustrates an exemplary operational process for invoking an application. In some implementations, the J2ME platform may be used to provide a platform from which applications may be launched to access and provide functionalities of the mobile device 100. Such an implementation may be used in any mobile device supporting J2ME.

At 302, a website is contacted by the browser. For example, a user may enter the URL or IP address of a website to be contacted, such as a banking site, insurance provider site, or the like. The user may select the website from a list of saved favorites or bookmarks. The browser may connect to the website 140 through the WAP gateway 130 to request a web page. The web page may be returned through the WAP gateway 130 to the browser 114 running on the mobile device 100.

At 304, a web page link selection is received. For example, the user may select a link on the web page using the touch sensitive display 106, the keypad 108 or another input mechanism. The user may select the link in order to perform a function, such as navigating to a subsequent web page, uploading a file, entering information, or for further interaction with the website 140.

At 306, the browser contacts the CHAPI for content handling. For example, if the user selects a link to perform an action not routinely handled by the browser (e.g., operating the camera, rendering an image, interacting with the file system of the mobile device 100), the CHAPI 208 contacts the AMS 202 at 308 to determine if one of applications 204a . . . 204n can handle the action. Thus, if the user selected a link to take a photograph, the CHAPI 208 may access the AMS 202 to determine which of applications 204a . . . 204n (e.g., application 204a) is able to access the camera.

If there is a content handler to handle the action, then at 310, the content hander is launched. For example, application 204a may be invoked to provide camera functionalities similar to native applications 112. In other implementations, these actions may include, but are not limited to, interacting with the mobile device file system, uploading a file to the website 140, accessing the audio interface 122 on the mobile device 100, etc.

At 312, the content hander executes an application to perform an action. For example, the particular application 204a executes to take a photograph in a manner substantially similar to that as if the user launched the mobile device's native camera application.

At 314, control is returned to the browser. For example, after the user took the photograph, the particular application 204a would exit, and the browser 114 would take control of the application environment and returned to the foreground.

At 316, further action would be received. If there are further actions, e.g., selections of links on the web page, then the process at 304-314 would be repeated. For example, the user may want to view the photographs by selecting a link on the web page. In another implementation, the user may wish to upload the photographs to the website. The user may select a link that opens a file system browser such that the user may select the photograph(s) to be upload. After making a selection, then the photograph(s) may be uploaded to the website 140 using a secure or unsecure link. If not, then the operational flow ends at 318.

Thus, in accordance with the operation flow of FIG. 3, the J2ME platform may be used to extend the capabilities of the browser 114 by providing applications to handle requests for operations beyond those normally handled by the browser.

Figure 4:
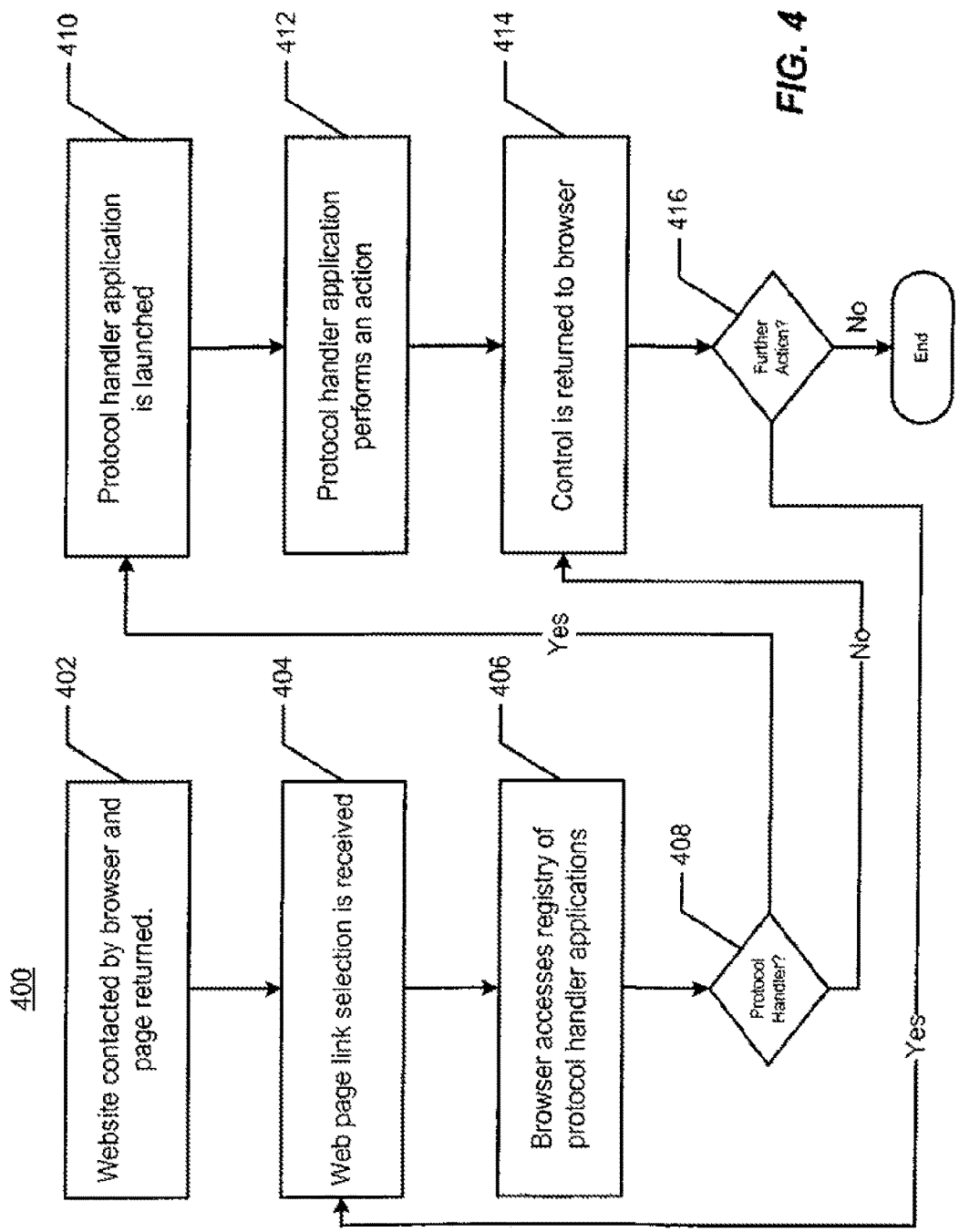
FIG. 4 illustrates another exemplary operational process for invoking an application.

FIG. 4 illustrates an exemplary operational process for invoking an application. In some implementations, the application environment of the mobile device 100 may provide applications that launch to provide access to functionalities based on a protocol specified by a selected link. Such implementations may be used in, for example, the APPLE IPHONE or GOOGLE ANDROID platforms.

At 402, a website is contacted by the browser. For example, a user may enter the URL or IP address of a website to be contacted, such as a banking site, insurance provider site, or the like. The user may select the website from a list of saved favorites or bookmarks. The browser may connect to the website 140 through the WAP gateway 130 to request a web page. The web page may be returned through the WAP gateway 130 to the browser 114 running on the mobile device 100.

At 404, a web page link selection is received. For example, the user may select a link on the web page using the touch sensitive display 106, the keypad 108 or another input mechanism. The user may select the link in order to perform a function, such as navigating to a subsequent web page, uploading a file, entering information, or for further interaction with the website 140.

At 406, the browser accesses a registry of protocol handler applications. If the user selects a link to perform an action not routinely handled by the browser (e.g., operating the camera, rendering an image, interacting with the file system of the mobile device 100), the browser 114 contacts the operation system 110 at 408 to determine if one of native application(s) 112 can handle the action. The action may be specified by a protocol specified in the selected link. For example, the link may specify a protocol in the form of myapp://, where "myapp" is the application to be launched. Thus, if the user selected a link to take a photograph (e.g., camera://), the operating system 110 may determine which of application(s) 112 (e.g., a camera application) is able to access the camera.

If there is a protocol handler application to handle the action, then at 410, the protocol handler application is launched. For example, the camera application may be invoked to provide camera functionalities. In other implementations, these actions may include, but are not limited to, native application(s) 112 for interacting with the mobile device file system, uploading a file to the website 140, accessing the audio interface 122 on the mobile device 100, etc.

At 412, the protocol handler application performs an action. For example, the camera application would take a photograph.

At 414, control is returned to the browser. For example, after the user took the photograph, the camera application would exit, and the browser 114 would take control of the application environment and returned to the foreground.

At 416, further action would be received. If there are further actions, e.g., selections of links on the web page, then the process at 404-414 would be repeated. For example, the user may want to view the photographs by selecting a link on the web page. In another implementation, the user may wish to upload the photographs to the website. The user may select a link that opens a file system browser such that the user may select the photograph(s) to be upload. After making a selection, then the photograph(s) may be uploaded to the website 140 using a secure, or unsecure link. If not, then the operational flow ends at 418.

Thus, in accordance with the operation flow of FIG. 4, native applications residing on the mobile device may be called by the browser 114 to handle requests for operations beyond those normally handled by the browser.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for accessing functionalities of a mobile device, comprising:
    receiving an indication that a link displayed in a web-based application has been selected for performing a functionality of the mobile device;
    determining a first application associated with the functionality from a registry of applications maintained by an application management software, wherein the first application is provided by a third party and the first application is capable of providing the same functionality as a second application that is provided by a manufacturer of the mobile device;
    executing the first application to perform the functionality on the mobile device comprising using a capability of the mobile device; and
    returning to the web-based application.

2. The method of claim 1, further comprising:
    providing a device independent runtime platform; and
    invoking the first application using a content handler application program interface (API) within the device independent runtime platform.

3. The method of claim 2, further comprising downloading the first application over a wireless network if the content handler API is not on the registry of applications.

4. The method of claim 2, wherein the content handler API is certified by a wireless service provider for installation on the mobile device, and wherein the first application is uncertified.

5. The method of claim 1, further comprising:
providing the first application as a Java archive (JAR) file residing on the mobile device; and
invoking the JAR file using a content handler application programming interface (API).

6. The method of claim 1, further comprising interpreting information associated with the indication that the link has been selected.

7. The method of claim 6, further comprising:
determining a Uniform Resource Locator (URL) specified by the information; and
invoking the first application to operate a component of the mobile device in accordance with the URL to perform the functionality on the mobile device.

8. The method of claim 1, wherein performing a functionality of the mobile device comprises one of operating a camera of the mobile device, rendering an image, and interacting with a file system of the mobile device.

9. A non-transitory computer-readable medium coupled to at least one computer having instructions stored thereon which, when executed by the at least one computer, cause the at least one computer to perform operations for accessing functionalities of a mobile device, the operations comprising:
receiving an indication that a link displayed in a web-based application has been selected for performing a functionality of the mobile device;
determining a first application associated with the functionality from a registry of applications maintained by an application management software, wherein the first application is provided by a third party and the first application is capable of providing the same functionality as a second application that is provided by a manufacturer of the mobile device;
executing the first application to perform the functionality on the mobile device comprising using a capability of the mobile device; and
returning to the web-based application.

10. The computer-readable medium of claim 9, wherein the operations further comprise:
providing a device independent runtime platform; and
invoking the first application using a content handler application program interface (API) within the device independent runtime platform.

11. The computer-readable medium of claim 10, wherein the operations further comprise downloading the first application over a wireless network if the content handler API is not on the registry of applications.

12. The computer-readable medium of claim 10, wherein the content handler API is certified by a wireless service provider for installation on the mobile device, and wherein the first application is uncertified.

13. The computer-readable medium of claim 9, wherein the operations further comprise:
providing the first application as a Java archive (JAR) file residing on the mobile device; and
invoking the JAR file using a content handler application programming interface (API).

14. The computer-readable medium of claim 9, wherein the operations further comprise interpreting information associated with the indication that the link has been selected.

15. The computer-readable medium of claim 14, wherein the operations further comprise:
determining a Uniform Resource Locator (URL) specified by the information; and
invoking the first application to operate a component of the mobile device in accordance with the URL to perform the functionality on the mobile device.

16. The computer-readable medium of claim 9, wherein performing a functionality of the mobile device comprises one of operating a camera of the mobile device, rendering an image, and interacting with a file system of the mobile device.

17. A system for accessing mobile device functionalities, comprising:
a memory having computer-readable instructions stored thereon; and
at least one processor coupled to the memory and configured to execute the computer-readable instructions to perform operations comprising:
receiving an indication that a link displayed in a web-based application has been selected for performing a functionality of the mobile device;
determining a first application associated with the functionality from a registry of applications maintained by an application management software, wherein the first application is provided by a third party and the first application is capable of providing the same functionality as a second application that is provided by a manufacturer of the mobile device;
executing the first application to perform the functionality on the mobile device comprising using a capability of the mobile device; and
returning to the web-based application.

18. The system of claim 17, wherein the operations further comprise:
providing a device independent runtime platform; and
invoking the first application using a content handler application program interface (API) within the device independent runtime platform.

19. The system of claim 18, wherein the operations further comprise downloading the first application over a wireless network if the content handler API is not on the registry of applications.

20. The system of claim 18, wherein the content handler API is certified by a wireless service provider for installation on the mobile device, and wherein the first application is uncertified.

21. The system of claim 17, wherein the operations further comprise:
providing the first application as a Java archive (JAR) file residing on the mobile device; and
invoking the JAR file using a content handler application programming interface (API).

22. The system of claim 17, wherein the operations further comprise interpreting information associated with the indication that the link has been selected.

23. The system of claim 22, wherein the operations further comprise:
determining a Uniform Resource Locator (URL) specified by the information; and
invoking the first application to operate a component of the mobile device in accordance with the URL to perform the functionality on the mobile device.

24. The system of claim 17, wherein performing a functionality of the mobile device comprises one of operating a camera of the mobile device, rendering an image, and interacting with a file system of the mobile device.

* * * * *

UNITED STATES PATENT AND TRADEMARK OFFICE
CERTIFICATE OF CORRECTION

PATENT NO. : 9,690,761 B1
APPLICATION NO. : 14/728804
DATED : June 27, 2017
INVENTOR(S) : Minya Liang and Teddy J. E. Voutour Page 1 of 1

It is certified that error appears in the above-identified patent and that said Letters Patent is hereby corrected as shown below:

In the Specification

Column 1, Line 16, delete "12/197,671" and insert -- 12/197,671, --, therefor.

Column 1, Line 16, after "2008," insert -- now abandoned, --.

Column 1, Line 17, delete "2008." and insert -- 2008, now abandoned. --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*